R. E. SULLIVAN.
CASING SPEAR.
APPLICATION FILED OCT. 18, 1916.
1,234,231.
Patented July 24, 1917.
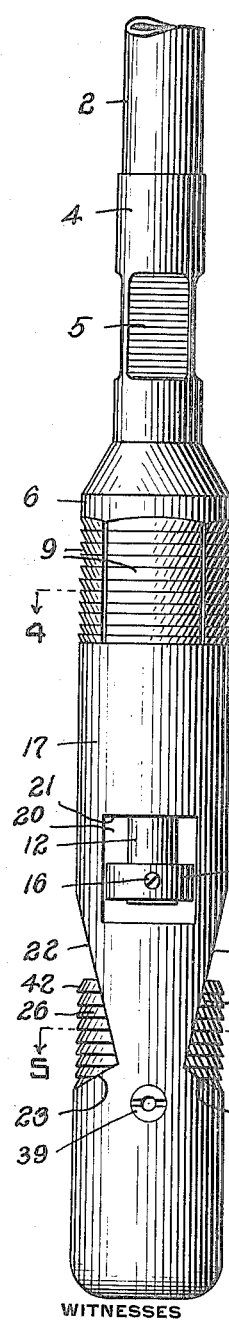
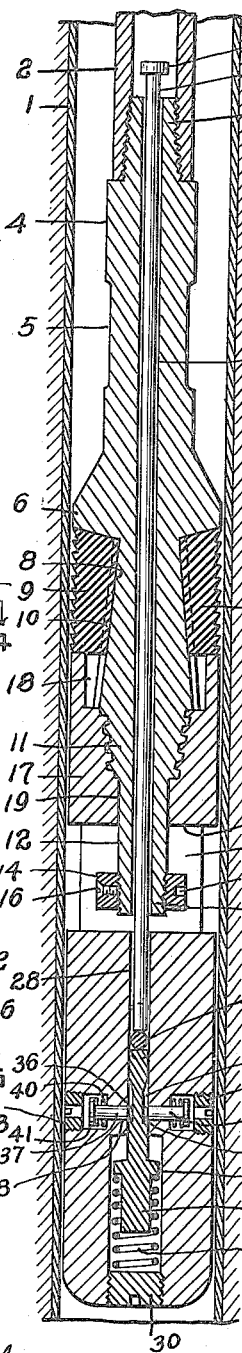
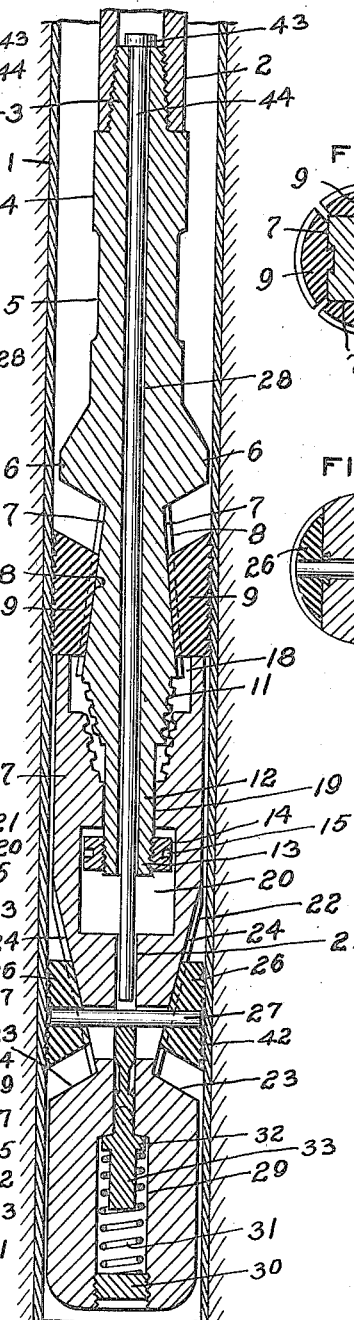
WITNESSES
J. Herbel Bradley.
Jo. Baily Brown
INVENTOR:
Robert E. Sullivan
by Fredk W. Winter
His Attorney

UNITED STATES PATENT OFFICE.

ROBERT E. SULLIVAN, OF FAIRMONT, WEST VIRGINIA.

CASING-SPEAR.

1,234,231.  Specification of Letters Patent.  Patented July 24, 1917.

Application filed October 18, 1916. Serial No. 126,345.

*To all whom it may concern:*

Be it known that I, ROBERT E. SULLIVAN, a resident of Fairmont, in the county of Marion and State of West Virginia, have invented a new and useful Improvement in Casing-Spears, of which the following is a specification.

This invention relates to casing spears, which are devices for pulling casing and piping from wells.

An object of the invention is to provide a device of the class mentioned, which can travel freely back and forth in a pipe, or casing, and yet which may be operated to grip the interior of the pipe at any desired point, to prevent further travel, or withdrawal, of the spear. A further object is to make such a device which normally travels freely in the casing, but which has means for preventing further forward travel, operable from the outside of the casing, and means to prevent withdrawal, operable by rotation of the spear connection, after the first mentioned locking means have engaged. A further object is to provide means for disengaging the locking means, so that the spear may be released and freely withdrawn at any time, even after it has been locked in position in the casing. A further object is to provide the locking means of such form that they automatically strengthen their grip on the casing as power is applied to draw the spear.

These and other objects are secured by a construction which may be illustrated as shown in the accompanying drawings, wherein Figure 1 is an elevation of the spear connected to a fishing pipe; Fig. 2 is a central vertical section through the spear and a casing into which it has been inserted, but which has not been engaged by the spear; Fig. 3 is a view similar to Fig. 2, showing the locking jaws engaging the casing; Fig. 4 is a section on the line 4—4 of Fig. 1; and Fig. 5 is a section on the line 5—5 of Fig. 1.

In oil well practice, and other constructions where holes are drilled into the earth, and a casing driven therein, it frequently becomes desirable, or necessary to pull this pipe, or casing out of the well. This is done by application of power from the surface of the ground, and it is very desirable to be able to apply this power to the casing at some point below the earth's surface. The exact place where this power may be most efficiently applied varies according to the length of the casing, the character of the earth drilled through, and other considerations. The spear which is the subject of this invention may be inserted into a casing, and will travel freely up and down therein. It has gripping jaws which may be actuated by externally operable means, so that the spear can be made to engage the casing at any desired point, determined by the depth the spear has been inserted below the surface of the ground. Having engaged the spear, power is applied to the fishing pipe, used to carry it, and the casing drawn out. If for any reason it is desired to remove the spear without withdrawing the pipe, as for example, it is found that the casing can not be drawn by the power applied, the spear may be disengaged by simply rotating the fishing pipe, and then is easily withdrawn.

These results are attained by the structure illustrated, though many variations in particular parts may be made without departure from the invention.

The casing 1 is ordinarily an iron or steel pipe driven into the well after it is drilled into the earth. This is ordinarily composed of sections of pipe which are joined together at their ends by some suitable form of connection, not relevant to this invention. My spear is adapted to be engaged at its upper end by a fishing pipe 2, having a beveled threaded mouth adapted to engage through the threaded extension 3 at the top of my spear. These are left-hand threads. The shank 4 of the spear has a portion cut away to form four flat faces 5, which are adapted to be engaged by a wrench for tightly securing the shank into the pipe 2. Below the square portion referred to the spear has an enlarged annular shoulder 6, which is cut away on its under side, and the spear body has four flat faces 7, oppositely disposed in pairs, these faces being downwardly and outwardly inclined, and having longitudinal dove-tailed grooves 8 along their middle lines. Four gripping jaws 9 having inner dovetailed ridges 10 adapted to be slidably fitted into the groove 8, are seated upon the faces 7. These gripping jaws have rearwardly pointed teeth on their outer surface, which is rounded, to form an arc of a circle approximately the same as the circumference of the shoulder 6.

Below the ends of the faces 7, the body is formed into a tapering threaded portion 11, and beyond that extends in a smaller cylindrical body portion 12, which has a threaded terminal 13, upon which a nut 14 is adapted to fit. This nut has indentations 15, to be engaged by a wrench or tool for turning it, and has a set screw 16, for locking it in position. The forward portion of the spear is in the form of a cylindrical part 17, the upper end of which contains a bore 18 adapted to pass over the faces 7, and to bear against the under side of the jaws 9, as shown in Fig. 2. Below this bore there is a threaded tapered bore adapted to engage the threaded portion 11 of the upper member of the spear, above described. Still a third bore 19, which is smaller and cylindrical, is adapted to form a passage for the extension 12, and below this the part 17 has a transverse passage 20 cut entirely through the part 17, and forming a space for movement up and down of the nut 14, as below described, which is limited in its upward travel by the shoulder 21, formed by the upper wall of the passage 20. Below the passage 20 the member 17 has two oppositely disposed upwardly and outwardly inclined faces 22 which terminate in inclined shoulders 23, as shown in Fig. 1. Dovetailed grooves or channels 24 extend longitudinally through the middle of the faces 22, and form retaining guides for dovetailed ridges 25, on the inner faces of jaws 26, which are slidably mounted on the inclined faces, as described, and as shown particularly in Fig. 5. The jaws 26 are connected by a pin 27, which is fixed in one of the jaws, and loosely connected to the other, so that the jaws in moving upward on the faces 22 may move outward and farther apart. A small central bore 28 extends axially through both the part 4 and the part 17, and this is enlarged to form a bore 29, at the lower end of the part 17. The outer end of bore 29 is threaded, and closed by a screw head 30, forming a seat for coil spring 31, which bears at its upper end against a shoulder 32 on a follower 33, movable in the bore 29. The upper end of this follower bears against the pin 27, and the pressure of spring 31 is constantly applied to force the jaws 26 upwardly and outwardly. In the body of the follower are undercut faces 34, having an overhanging portion 35 adapted to engage a dovetailed terminal 36 of a plunger 37 which is carried in lateral bore 38 inside of the member 17. This bore 38 is closed by a screw cap 39, and a coil spring 40 bears against a head 41 on the plunger, and tends to force it outward against the screw head.

The operation of the device is as follows:—Before inserting the spear into the casing, the jaws 26 are pushed inward and downward to the position shown in Fig. 1, the screws 39 having been removed, the plungers 37 are pressed inward by external means, until the dovetailed terminals 36 bear against the faces 34 of the plunger 33. Then the jaws 26 are released, and the follower 33 moves upward until its undercut portions 35 are engaged by the terminals 36, and locked there, as shown at the bottom of Fig. 2. This holds the jaws 26 locked in the position shown in Fig. 1, the downwardly pointed teeth 42, being then withdrawn within the periphery of the main body of the spear. With these jaws so locked in position, the spear is tightly threaded into the mouth of the fishing pipe 2. The two main members 4 and 17 of the spear are threaded together, as shown in Fig. 2, which locks the four jaws 9 in raised position, as shown in Fig. 2, and holds them with their teeth withdrawn inside the periphery of the spear body. The spear is then inserted in the casing to any required depth, upon which a weight on the end of a line, or a rod, is inserted in the pipe 2, to strike the head 43 of a plunger 44, which extends in the axial bore 17 to a seat on the pin 27. When the plunger 44 is depressed until its head seats on the top of extension 3, the follower 33 has been pushed downward, the heads 36 are disengaged by the shoulders 35, and the pins 37 are withdrawn, leaving the follower 33 free to be moved upward by the spring 31, carrying with it the two jaws 26 by reason of their connection to pin 27. As the jaws move upward they ride outward on the inclined faces 22 until they come in contact with the inner wall of the casing. Pressure forward on the fishing pipe engages the teeth 42 with the casing wall, and they are firmly wedged into locked position, holding the body portion 17 of the spear firmly locked against rotation. Then by turning the fishing pipe so as to disengage the threaded portion 11 from the coöperating threaded bore of the part 17, the upper body member of the spear is withdrawn, the lower body member remaining in place. As the body member 4 moves upward, the toothed jaws 9 slide downward on the inclined faces 7, and are consequently moved outward until they rest against the casing wall. Upon further withdrawing movement of the part 4, the inclined faces wedge the jaws 9 outward against the casing wall, and the rearwardly pointed teeth 10 are firmly engaged therewith. The body member 4 can not become disengaged from the lower body member 17, because of the retaining nut 14, and because the jaws 9 lock it against withdrawal beyond the point where said jaws come in contact with the wall.

The spear is now firmly locked in position against either forward or rearward travel, and by applying proper withdrawing power to the pipe 2, the casing may be pulled from the well.

Should it become necessary or desirable to withdraw the spear without pulling the casing, this may be done by rotating the fishing pipe in the opposite direction, with downward pressure thereon, causing the beveled threaded portion 11 to reëngage the threaded portion of body member 17. As the upper body part moves downward, the jaws 9 are pressed upward by the body member 17, and as they ride upward and inward on the inclined faces 7, they are withdrawn from contact with the casing wall, and released. The teeth 42 of the lower locking jaws 26 are forwardly inclined, and said jaws are forced upward only by spring pressure, consequently when the spear is withdrawn, these jaws readily move downward and inward, and do not prevent withdrawal of the spear.

The many uses and advantages of my device will be apparent to those familiar with the art. It is simple to operate, positive in action, and readily removable for adjustment or repair. By using gripping jaws of different size, I may use the same spear to draw casing of different sizes, thus avoiding the necessity of keeping on hand a variety of different sized spears.

I claim:—

1. A casing spear comprising a head adapted to travel freely in a well casing, gripping parts carried in lateral recesses of the head normally inside the periphery thereof, and positive means operable by rotation of the spear to extend the gripping parts outside the periphery of the head to engage the casing.

2. A casing spear comprising a head adapted to travel freely in a well casing, gripping parts carried in lateral recesses of the head and normally inside the periphery thereof, one set of gripping parts being held in withdrawn position against spring pressure, means externally operable to release said spring-controlled gripping parts to allow them to engage the wall of the casing, and another set of gripping parts adapted to be extended to grip the casing by rotation of a part of the head after the first set of gripping parts has engaged the casing.

3. A casing spear comprising a head in two parts having a threaded connection, lateral recesses in the forward part of the head, gripping jaws seated in said recesses having forwardly pointed teeth, externally actuated means to move said jaws outward to engage the casing, gripping jaws having rearward pointed teeth seated in recesses in the rear part of the head, and means to move said rearwardly pointing jaws outward to engage the casing by rotation of the rear part of the head after the forward part has been locked by the first set of jaws.

4. A casing spear comprising a head in two parts having a threaded connection, lateral recesses in the forward part of the head, gripping jaws seated in said recesses having forwardly pointed teeth, a spring bearing against said jaws to force them outward, a catch normally holding the jaws in withdrawn position, means for releasing the catch, and gripping jaws having rearward pointed teeth seated in recesses in the rear part of the head and adapted to be moved outward to engage the casing upon rotation of the rear part of the head after the forward part has been locked by the first set of jaws.

5. A casing spear having a lower set of jaws normally seated on upward and outwardly inclined faces inside the periphery of the spear head, externally controlled means to force said jaws upward and outward to engage a casing wall and so to prevent forward movement of the spear, a second set of jaws normally seated inside the periphery of the spear head and adapted to be extended outward and downward to engage the casing wall after the first set have been extended, and externally operable means to withdraw the upper set of jaws into the spear head while the lower set are engaged.

6. A casing spear comprising a head adapted to travel freely in a well casing, two sets of toothed jaws having rearwardly and forwardly pointed teeth respectively normally seated on inclined faces within the periphery of the spear, positive externally operable means to move the jaws on the inclined faces to engage the casing, and positive means to release the rearwardly pointed jaws to permit removal of the spear.

7. A casing spear comprising a head normally adapted to travel freely in the casing, toothed jaws normally retained within the periphery of the spear and having teeth pointing in opposite directions, said jaws being slidably seated on oppositely inclined springs pressing the forwardly pointing jaws downward, a lock adapted to hold said forwardly pointing jaws withdrawn in the head, positive externally operable means to release the lock, and means to move the laterally pointing jaws outward by rotation of the spear.

8. A casing spear comprising a head normally adapted to travel freely in the casing, toothed jaws normally withdrawn inside the periphery of the spear and having teeth pointing in opposite directions, positive means to move the jaws outwardly to engage the casing, and means to withdraw the jaws having rearwardly pointed teeth by rotation of the spear to allow withdrawal thereof from the casing.

9. A casing spear comprising a head normally adapted to travel freely in the casing, gripping jaws having forwardly pointed teeth, a spring normally pressing said jaws upward and outward, a device to hold the jaws in withdrawn position against pressure of the spring, and positive means to release the holding device operable from the outside of the casing.

10. A casing spear comprising a head normally adapted to travel freely in the casing, spring-operated means controllable from outside the casing to lock the spear against forward travel, and means operable by rotation of the spear to lock it against withdrawal from the casing.

11. A casing spear comprising a head normally adapted to travel freely in the casing, spring-operated means positively controllable from outside the casing to lock the spear against forward travel, means operable by rotation of the spear to lock it against rearward travel, and means to release the rearward lock to permit withdrawal of the spear.

In testimony whereof I have hereunto set my hand.

ROBERT E. SULLIVAN.

Witnesses:
GLENN H. LERESCHE,
A. E. JOHNSON.